United States Patent
Nabuurs et al.

(10) Patent No.: US 10,767,072 B2
(45) Date of Patent: Sep. 8, 2020

(54) POLYMER, PROCESS AND USE

(71) Applicant: DSM IP Assets B.V., Heerlen (NL)

(72) Inventors: Tijs Nabuurs, Echt (NL); Willem-Jan Soer, Echt (NL); Gerardus Cornelis Overbeek, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 259 days.

(21) Appl. No.: 15/519,354

(22) PCT Filed: Oct. 21, 2015

(86) PCT No.: PCT/EP2015/074333
§ 371 (c)(1),
(2) Date: Apr. 14, 2017

(87) PCT Pub. No.: WO2016/062752
PCT Pub. Date: Apr. 28, 2016

(65) Prior Publication Data
US 2017/0240765 A1 Aug. 24, 2017

(30) Foreign Application Priority Data
Oct. 21, 2014 (EP) .................................. 14189779

(51) Int. Cl.
| | | |
|---|---|---|
| C09D 151/00 | (2006.01) | |
| C09D 4/00 | (2006.01) | |
| B05D 7/02 | (2006.01) | |
| B05D 7/08 | (2006.01) | |
| B05D 7/14 | (2006.01) | |
| C03C 17/32 | (2006.01) | |
| C08F 265/06 | (2006.01) | |
| C23C 26/00 | (2006.01) | |
| C08F 265/04 | (2006.01) | |

(52) U.S. Cl.
CPC ........... *C09D 151/003* (2013.01); *B05D 7/02* (2013.01); *B05D 7/08* (2013.01); *B05D 7/14* (2013.01); *C03C 17/324* (2013.01); *C08F 265/06* (2013.01); *C09D 4/00* (2013.01); *C23C 26/00* (2013.01); *C08F 265/04* (2013.01)

(58) Field of Classification Search
CPC .... C08F 265/10; C08F 265/04; C08F 265/06; C09D 151/003; C09D 4/00
USPC .......................................................... 522/149
See application file for complete search history.

(56) References Cited

U.S. PATENT DOCUMENTS

| | | | | |
|---|---|---|---|---|
| 4,988,762 A * | 1/1991 | Overbeek | .................. | C08F 8/30 524/839 |
| 5,364,891 A * | 11/1994 | Pears | ........................ | C08F 8/00 522/149 |
| 5,962,571 A * | 10/1999 | Overbeek | .................. | C08F 8/30 428/460 |
| 7,049,352 B2 * | 5/2006 | Gould | .................... | C08F 285/00 523/201 |
| 2003/0055171 A1 * | 3/2003 | Overbeek | .......... | C08G 18/0823 525/192 |
| 2011/0200830 A1 * | 8/2011 | Tennebroek | .............. | B32B 7/12 428/423.1 |
| 2017/0240765 A1 * | 8/2017 | Nabuurs | .................. | C09D 4/00 |

FOREIGN PATENT DOCUMENTS

| | | |
|---|---|---|
| WO | WO 95/29963 | 11/1995 |
| WO | WO 03/031526 | 4/2003 |

OTHER PUBLICATIONS

International Search Report and Written Opinion of the ISA for PCT/EP2015/074333, dated Nov. 30, 2015, 11 pages.
Wicks et al, "Organic Coatings, Science and Technology", Third Edition, Wiley-Interscience, John Wiley & Sons, Inc., pp. 180-181 (2007).

* cited by examiner

*Primary Examiner* — Michael A Salvitti
(74) *Attorney, Agent, or Firm* — Nixon & Vanderyhe P.C.

(57) ABSTRACT

The current invention relates to a process for preparing an aqueous binder composition free of organic solvent, the process comprising at least the following steps: A) preparing a hydrophilic vinyl polymer (Polymer A) by polymerisation of a monomer composition A that contains: Ai) at least one carboxylic acid functional olefinically unsaturated monomer; and Aii) at least one olefinically unsaturated monomer different than Ai); and Aiii) optionally at least one wet adhesion promoting olefinically unsaturated monomer different than Ai and Aii); where Polymer A has an acid value (AV) from 32 to 98 mg KOH/g of solid Polymer A; B) preparing a hydrophobic vinyl polymer (Polymer B) by emulsion polymerization of a monomer composition B in the presence of Polymer A where the monomer composition B contains: Bi) at least one olefinically unsaturated monomer; Bii) optionally carboxylic acid functional olefinically unsaturated monomer different than Bi); and Biii) optionally wet adhesion promoting olefinically unsaturated monomer different than Bi); where Polymer B has an acid value (AV) of no more than 23.4 mg KOH/g of solid polymer B, wherein at least a part of the carboxylic acid groups that are present in Polymer A and Polymer B are neutralized during or following the steps A and/or B to form a (partially) neutralized polymer emulsion; where the weight average molecular weight (Mw) of Polymer A is lower than the weight average molecular weight (Mw) of polymer B; and wherein the process is further characterized by the presence of a further step C) reacting at least 10 mol % of the carboxylic acid and/or carboxylate salt groups of the (partially) neutralized polymer emulsion with an iminating agent to produce an iminated polymer C; wherein the total amount of surfactant applied in steps A, B and C is at most 0.5 wt. %, based on the total weight of monomers charged for the preparation of polymer A and polymer B.

21 Claims, No Drawings

POLYMER, PROCESS AND USE

This application is the U.S. national phase of International Application No. PCT/EP2015/074333 filed 21 Oct. 2015, which designated the U.S. and claims priority to EP Patent Application No. 14189779.3 filed 21 Oct. 2014, the entire contents of each of which are hereby incorporated by reference.

The present invention relates to the field of acrylic polymers especially those useful in the preparation of coatings.

Aqueous acrylic polymer coating emulsions are well known and are for example described in U.S. Pat. No. 4,988,762, WO2003/031526, WO95/29963 and WO95/29944. Aqueous emulsions are a class of disperse systems consisting of at least one organic phase emulsified in water. The organic polymer (the disperse phase) is dispersed in water (the continuous phase). To stabilize the particles containing the organic phase, one needs a third component, namely a surfactant (also referred to as emulsifier). The presence of a surfactant is crucial in the formation of the polymer particles and for its long-term stability. In the preparation of acrylic polymer emulsions, conventional surfactants are usually applied such as for example Na, K and $NH_4$ alkyl sulphates such as sodium lauryl sulphate (SLS) and sodium dodecyl benzene sulphonate (SDBS).

The present invention in particular relates to a process for preparing an aqueous binder composition free of organic solvent, the process comprising at least the following steps:
  A) preparing a hydrophilic, acid functional vinyl polymer (Polymer A) by polymerisation of a monomer composition A that contains:
    Ai) at least one carboxylic acid functional olefinically unsaturated monomer; and
    Aii) at least one olefinically unsaturated monomer different than Ai); and
  B) preparing a hydrophobic vinyl polymer (Polymer B) by emulsion polymerization of a monomer composition B in the presence of Polymer A where the monomer composition B comprises olefinically unsaturated monomer; and wherein at least a part of the carboxylic acid groups employed in step A and optionally in step B are neutralized during or following the steps A and/or B to form a (partially) neutralized polymer emulsion; and wherein the weight average molecular weight (Mw) of polymer A is lower than the weight average molecular weight (Mw) of polymer B.

Such process is described in WO95/29963 and WO95/29944.

WO95/29963 describes a process for preparing in situ a solvent-free aqueous cross-linkable polymer compositions by emulsion polymerisation of a) a softer (Tg 25° C. less than "oligomer" B) olefinic hydrophobic polymer A in the presence of b) a harder ($T_g$ 10 to 125° C.) acid-functional "oligomer" B having cross-linking groups thereon; and then c) crosslinking the mixture of hard "oligomer" B and soft polymer A to form a composition with Koenig hardness of >=40 seconds and minimum film forming temperature (MFFT) of <=55° C. WO95/29944 describes a similar process to '63 where solvent free aqueous crosslinkable polymer compositions are prepared in situ from emulsion polymerization of a) a harder ($T_g$ 25° C. more than "oligomer" B) olefinic hydrophobic polymer A; in the presence of b) a softer ($T_g$<50° C.) acid-functional "oligomer" B having cross-linking groups thereon; and then c) cross-linking the mixture of soft "oligomer" B and hard polymer A to form a composition with Koenig hardness of >=40 seconds and 'MFFT' of <=55° C. In WO95/29963 and WO95/29944 the acid functional oligomer acts as a surfactant (i.e. as emulsifying agent) in the polymerisation of the hydrophobic polymer and hence a stable emulsion can be obtained with only a very low level of added surfactant (not counting the acid-functional oligomer itself). The absence of added surfactant or the presence of very low levels of added surfactant is advantageous since surfactant remains in the coating after drying and conventionally applied added surfactants adversely affect the water resistance of the coating as for example taught in U.S. Pat. No. 4,151,143.

However, the disadvantage of the aqueous binder compositions as described in WO95/29963 and WO95/29944 is that the wet adhesion (for example as measured by wet scrub resistance) is not sufficiently high. After application to either interior or exterior surfaces, paints may be subjected to conditions of high humidity or condensation. This may sometimes lead to a loss of adhesion to the substrate over which they have been applied. The wet scrub resistance test is a quantitative measure of the adhesion of paints to substrates under such conditions.

The object of the present invention is to improve the wet adhesion of aqueous binder compositions as described in WO95/29963 and WO95/29944.

The applicant has surprisingly found that the (un-iminated) acrylic polymer compositions described in WO95/29944 and WO95/29963 can be iminated, and the wet adhesion can be improved, while unexpectedly the resultant iminated dispersions are still stable, even without using large amount of surfactant and the so-obtained iminated acrylic polymer compositions can be used to form coatings with good coating properties.

Accordingly, the present invention relates to a process for preparing an aqueous binder composition free of organic solvent, the process comprising at least the following steps:
  A) preparing a hydrophilic vinyl polymer (Polymer A) by polymerisation of a monomer composition A that contains:
    Ai) at least one carboxylic acid functional olefinically unsaturated monomer; and
    Aii) at least one olefinically unsaturated monomer different than Ai); and
    Aiii) optionally at least one wet adhesion promoting olefinically unsaturated monomer different than Ai and Aii);
    where Polymer A has an acid value (AV) from 32 to 98 mg KOH/g of solid Polymer A;
  B) preparing a hydrophobic vinyl polymer (Polymer B) by emulsion polymerization of a monomer composition B in the presence of Polymer A where the monomer composition B contains:
    Bi) at least one olefinically unsaturated monomer;
    Bii) optionally carboxylic acid functional olefinically unsaturated monomer, different than Bi); and
    Biii) optionally wet adhesion promoting olefinically unsaturated monomer different than Bi);
    where Polymer B has an acid value (AV) of no more than 23.4 mg KOH/g of solid polymer B,
    wherein at least a part of the carboxylic acid groups that are present in Polymer A and Polymer B are neutralized during or following the steps A and/or B to form a (partially) neutralized polymer emulsion;
    where the weight average molecular weight (Mw) of Polymer A is lower than the weight average molecular weight (Mw) of Polymer B;
    and wherein the process is further characterized by the presence of a further step C) reacting at least 10 mol % of the carboxylic acid and/or carboxylate salt groups of the (partially) neutralized polymer emulsion with an iminating agent to produce an iminated polymer C;

wherein the total amount of surfactant applied in steps A, B and C is at most 0.5 wt. % based on the total weight of monomers charged for the preparation of Polymer A and Polymer B.

U.S. Pat. No. 4,988,762 describes self cross-linked polymers comprising chain pendant carbonyl and amine groups, where the amine functionality is optionally introduced by adding an aziridine (imination). This document does not disclose preparation of Polymer A-Polymer B emulsions, in which Polymer A and Polymer B has different weight average molecular weight. Polymer latexes that are prepared sequentially are described, but there is no teaching that a hydrophobic second stage may be colloidally stabilized by an acid rich first phase. Indeed, to obtain a stable iminated dispersion, a high amount of surfactant (emulsifier) is used.

WO03/031526 describes a pigmented coating composition comprising a polymer latex produced using a seed polymer in a multi-stage process. The multi-stage polymer preferably having amino functionality incorporated by an imination reaction. Also in this document, the teaching is that a high amount of added, low molecular weight surfactant (emulsifier) is needed to obtain a stable iminated dispersion. Thus, there is no teaching that when iminating a polymer latex, stabilisation of the latex during iminating and stabilisation of the iminated polymer latex can be obtained by the presence of an acid rich polymer phase.

U.S. Pat. No. 5,662,985 describes a label facestock which uses an adhesive anchor layer which may include an iminated polymer of an ethylenically unsaturated carboxylic acid and a $C_{2-8}$ alkyl methacrylate or $C_{1-8}$ alkyl methacrylate. There is no suggestion such polymers could be used as a binder for a coating.

Neither of the "oligomer"/polymer systems described in WO95/29963 or WO95/29944 are iminated and indeed there are good reasons that would deter a skilled person from iminating such systems.

By imination, amino chain-pendant functional groups (as part of amino ester groups) are introduced on the polymer by reacting carboxyl acid (or carboxylate salt) functional groups of the precursor polymer and alkylene imine(s) such as ethylene imine, propylene imine or butylene imine. The carboxylic acid functional groups are introduced in the precursor polymer by employing ethylenically unsaturated acid functional monomer(s) such as acrylic acid or methacrylic acid. This reaction is well established in the art, being known as an imination reaction. However it has been believed until now that many types of polymer systems could not be iminated given the nature of the imination reaction since for example iminated coatings could not be prepared from aqueous polymer dispersions systems where the polymer is stabilized by the presence of carboxylic acid functional groups, and hence where stabilization requires a high acid value of the polymer. As such it has been thought that reaction of the carboxylic acid groups with the iminating agent would cause the dispersed polymer to destabilize. This is the more so since it is known that amino functional groups (which are formed by the imination reaction) tend to interact with carboxyl groups and thus one would expect that this would lead to further destabilisation of the polymer emulsion. Stabilising the system by other means such as using large amounts of surfactant is undesirable as this would create other problems such as an increased susceptibility to water (i.e. low water resistance), as for example taught in U.S. Pat. No. 4,151,143. Therefore until now such polymer systems have never been iminated.

It has in particular been found that the resultant iminated compositions can exhibit excellent wet adhesion (i.e. preferably with a wet scrub resistance, measured as described herein, of at least 2000 cycles) to wet substrates such as wood or aged alkyd resins while unexpectedly the resultant iminated dispersions are still stable, even without using large amount of surfactant. Moreover, the iminated compositions of the present invention do not compromise other desired properties of un-iminated compositions. For example one preferred aspect of the invention relates to coating compositions resulting in coatings that also exhibit one or more of: good outdoor durability, good mechanical properties (such as elongation at break and toughness), good water resistance, good film forming properties (i.e. minimum film forming temperature of $<=55°$ C.), good König hardness (i.e. $>=40$ sec) and/or good blocking resistance compared to the same, but non-iminated coating compositions. A preferred object of this invention is that some or all of the desirable properties described herein are maintained or even improved after imination.

In case surfactant is used, the total amount of added surfactant (not counting Polymer A itself and not counting Polymer B itself in case the monomer composition for preparing Polymer B contains carboxylic acid functional olefinically unsaturated monomer) applied in steps A, B and C is at most 0.5 wt. % based on the total weight of monomers charged for the preparation of polymer A and polymer B, preferably the total amount of added surfactant applied in steps A, B and C is at most 0.2 wt. % solid surfactant based on the total weight of monomers charged for the preparation of Polymer A and Polymer B.

In case surfactant is used in the process of the invention, it is preferably only added at the start of step A and/or during step A (thus preferably not in steps B and C) in an amount of at most 0.5 wt. %, more preferably in an amount of at most 0.2 wt. % (based on the total weight of monomers charged for the preparation of polymer A and polymer B). Thus, in case added surfactant is used in the process of the invention, the added surfactant that is present in the aqueous binder composition according to the present invention is preferably added only at the start of and/or during step A of the process of the invention. In step B, preferably no surfactant (not counting Polymer A itself) is added. It has surprisingly been found that step C can be carried out even in the absence of added surfactant (not counting Polymer A itself and not counting Polymer B itself in case the monomer composition for preparing Polymer B contains carboxylic acid functional olefinically unsaturated monomer). In case surfactant is applied in step A and optionally step B, step C will in general be carried out in the presence of the surfactant added in step A and optionally step B since it is difficult or even impossible to remove added surfactant from the aqueous binder composition, although step C can be carried out in the absence of added surfactant. As such, the present invention advantageously allows obtaining stable, iminated aqueous binder compositions comprising added surfactant in an amount of at most 0.5 wt. %, even in an amount of at most 0.2 wt. %, based on the total weight of monomers charged for the preparation of Polymer A and Polymer B. In case polymer A is obtained by emulsion polymerisation, the process of the invention is preferably carried out in the presence of the minimum amount of surfactant needed to get a stable emulsion of polymer A particles, which is in general at least 0.01 wt. % of added surfactant, preferably at least 0.02 wt. % of added surfactant, and more preferably at least 0.03 wt. % of added surfactant ((based on the total weight of monomers charged for the preparation of polymer A and polymer B).

Conventional surfactants can be used, e.g. anionic, and/or non-ionic emulsifiers such as Na, K and $NH_4$ salts of dialkylsulphosuccinates; Na, K and $NH_4$ salts of sulphated oils; Na, K and $NH_4$ salts of alkyl sulphonic acids; Na, K and $NH_4$ alkyl sulphates such as sodium lauryl sulphate (SLS) and sodium dodecyl benzene sulphonate (SDBS); $C_{12-24}$ fatty alcohols, ethoxylated fatty acids and/or fatty amides; and Na, K and $NH_4$ salts of fatty acids such as Na stearate and Na oleate; aryl-containing analogues of the alkyl-containing surfactants are also useful; other surfactants include phosphates.

In the present invention, the chain-pendant amine functionality is introduced into the polymer by an imination reaction involving the carboxylic acid and carboxylate salt groups of the precursor polymer and an added aziridine compound (also referred to as iminating agent). The iminating agent is preferably an alkylene amine, more preferably a $C_{1-4}$ alkylene imine. The iminating agent is preferably selected from the group consisting of ethylene imine (=aziridine, CAS 151-56-4), propylene imine (2-methyl aziridine, CAS 75-55-8), butylene imine (2-ethyl aziridine) and any mixture thereof. More preferably, the iminating agent is propylene imine.

The amount of alkylene imine employed in the present invention is such that at least 10 mol % of the total amount of carboxylic acid and carboxylate salt groups present in the (partially) neutralized polymer emulsion is reacted with the iminating agent. Preferably, the amount should be sufficient to iminate from 10 mol % to 90 mol % of the total amount of carboxylic acid and carboxylate salt groups present in the (partially) neutralized polymer emulsion, more preferably from 20 to 80 mol %.

More preferably, the percentage of carboxylic acid and carboxylate salt groups that is reacted with the iminating agent is determined such that the degree of iminization is between DI low and DI high which are determined by the following formulas:

$$DI^{LOW}(\%)=[(AV*0.682)-11.8]*100\%,$$

$$DI^{HIGH}(\%)=[(AV*1.061)-14]*100\%,$$

where the AV is the AV of the (partially) neutralized polymer emulsion.

Preferably, the emulsion containing the iminated polymer C preferably comprises free unreacted iminating agent in an amount of less than 10 ppm, preferably less than 1 ppm by weight of the total composition, preferably is completely free of unreacted iminating agent. Preferably in step C the iminating agent is allowed to substantially completely, preferably completely react with the imine reactive groups so that the composition obtained from step C is substantially free, preferably completely free of unreacted iminating agent. In an alternative embodiment any iminating agent remaining may be removed from the dispersion by for example evaporation. By free of iminating agent is meant that no (or less than or equal to a trace amount) of unreacted iminated agent can be detected by the following conventional analytical techniques. The quantification of free imine is based on a combined extraction/derivatisation step with benzene sulfonyl chloride in iso-octane. The resulting derivate (2-methyl-1(phenylsulfonyl)aziridine) is formed instantaneously and analysed by liquid injection Gas Chromatography (GC) followed by detection with a Nitrogen Phosphorous Detector (NPD). A Thermo TriPlus auto sampler equipped with 10 µl syringe (Teflon tipped plunger) was used to inject 2 µL (injection speed 100 µl/sec, temperature 275° C., split flow 20 ml/min). The GC column used: SGE BP-5 30×0.25 mm, $d_f$=0.25 µm. The gas flow was 2 ml He/min and the oven was programmed as follows: t=0-0.5 min 50° C., 30° C./min to 200° C., followed by 10° C./min to 300° C. (1 min). The NPD detector was operating at 300° C. ($H_2$ flow 2.3 ml/min, air flow 60 ml/min and $N_2$ flow 15 ml/min). Tris(2-ethylhexyl)amine, after extraction/derivatisation, was used as internal standard. The sample (1000 mg polymer dispersion+100 µl 1M KOH) was diluted with 3 ml of iso-octane, which contains (0.5% v/v benzenesulfonyl chloride and 300 mg tris(2-ethylhexyl)amine. The sample solution separated in 2 layers; the clear top layer was injected onto the GC.

The hydrophilic vinyl polymer (polymer A) is obtained by radical polymerization of a monomer composition A that contains:

Ai) at least one carboxylic acid functional olefinically unsaturated monomer monomer; and Aii) at least one olefinically unsaturated monomer different than Ai); and Aiii) optionally at least one olefinically unsaturated monomer with further wet adhesion promoting groups, different than Ai) and Aii);

where Polymer A has an acid value (AV) from 32 to 98 mg KOH/g of solid Polymer A.

Polymer A is preferably obtained by solution, emulsion or suspension polymerization. In case Polymer A is obtained by solution polymerization, the applied solvent, preferably a volatile solvent, is removed during and/or after preparation of Polymer A or Polymer B. Preferably the process to prepare the aqueous binder composition according to the invention is free of organic solvent. As such, Polymer A is preferably obtained by emulsion or suspension polymerization. Most preferably, Polymer A is obtained by emulsion polymerization.

The radical polymerization to obtain Polymer A is conducted using a free radical initiator, appropriate heating and agitation (stirring). The polymerisation can employ conventional free radical initiators [e.g. hydrogen peroxide, t-butylhydroperoxide, cumene hydroperoxide, persulphates such as ammonium, K and Na salts of persulphate; redox systems may be used; combinations such as t-butyl hydroperoxide isoascorbic acid and FeEDTA are useful; the amount of initiator, or initiator system, is generally 0.05 to 3% based on the weight of total monomers charged. The molecular weight of Polymer A can be controlled by the use of well-known chain transfer agents. Preferred chain transfer agents can include mercaptanes and alkyl halogenides. More preferred, the chain transfer agent is selected from the group of lauryl mercaptane, 3-mercapto propionic acid, i-octyl thioglycolate, mercaptoethanol, tetrabromo methane, or tribromo methane. Most preferably the chain transfer agent is a mercaptane, selected from the group of lauryl mercaptane, 3-mercapto propionic acid, i-octyl thioglycolate, and mercaptoethanol.

In a special embodiment, the low molecular weight phase of vinyl Polymer A is prepared using catalytic chain transfer polymerization. Details and preferences of this process can be taken from for instance WO06/007999.

The acid value of Polymer A is preferably from 32 to 98 mg KOH/g of solid Polymer A, more preferably from 32.5 to 81.5 mg KOH/g of solid Polymer A, even more preferably from 35.5 to 68.5 mg KOH/g of solid Polymer A, most preferably from 39 to 65.5 mg KOH/g of solid Polymer A.

The hydrophobic vinyl polymer (Polymer B) is obtained by emulsion polymerization of a monomer composition B in the presence of Polymer A where the monomer composition B contains:

Bi) from 87 to 100 wt. % of at least one olefinically unsaturated monomer; and

Bii) at most 3 wt. % of carboxylic acid functional olefinically unsaturated monomer, different than Bi); and Biii) at most 10 wt. % of olefinically unsaturated monomer with wet adhesion promoting groups, different than Bi);

where the summed amount of Bi, Bii, Biii is 100 wt. %; and where Polymer B has an acid value (AV) of no more than 23.4 mg KOH/g of solid polymer B.

The acid value of Polymer B is preferably less than 6.5, more preferably less than 3.2, more preferably less than 1 mg KOH/g of solid Polymer B. Most preferably the acid value of Polymer B is zero mg KOH/g of solid Polymer B.

Optionally, Polymer A and/or Polymer B having functional groups for imparting crosslinkability when the aqueous binder composition is subsequently dried.

The solid/solid weight ratio of Polymer A to Polymer B is respectively preferably from 20 to 50 of A to from 50 to 80 of B; more preferably from 23 to 35 of A to from 65 to 77 of B; and most preferably from 26 to 31 of A to from 69 to 74 of B.

Polymer A and Polymer B have glass transition temperatures which are preferably different by at least 25° C.; more preferably different by at least 40° C.; even more preferably different by at least 60° C. and even more preferably different by at least 80° C.

As used herein, the glass transition temperature is determined by calculation by means of the Fox equation. Thus the $T_g$ in degrees Kelvin, of a copolymer having "n" copolymerised comonomers is given by the weight fractions W of each comonomer type and the $T_g$'s of the homopolymers (in degrees Kelvin) derived from each comonomer according to the equation:

$$\frac{1}{Tg} = \frac{W_1}{Tg_1} + \frac{W_2}{Tg_2} + \ldots + \frac{W_n}{Tg_n}$$

The calculated $T_g$ in degrees Kelvin may be readily converted to ° C. If the hydrophobic vinyl Polymer B is a homopolymer, its $T_g$ is simply that of the polymerized monomer.

In one embodiment of the invention, the Polymer A has a $T_g$<50° C., preferably from −75° C. to 45° C., preferably from −50° C. to 20° C.; and the $T_g$ of Polymer B is at least 25° C. higher than the $T_g$ of polymer A, preferably at least 40° C. higher than the $T_g$ of polymer A, more preferably at least 60° C. higher than the $T_g$ of polymer A, even more preferably at least 80° C. higher than the $T_g$ of polymer A.

In a more preferred embodiment of the invention, the Polymer A has a $T_g$ from 40° C. to 125° C., preferably from 55° C. to 125° C., and more preferably from 70° C. to 125° C.; and the $T_g$ of Polymer B is at least 25° C. below the $T_g$ of polymer A, preferably at least 40° C. below the $T_g$ of polymer A, more preferably at least 60° C. below the $T_g$ of polymer A, even more preferably at least 80° C. below the $T_g$ of polymer A.

In the present invention, the weight average molecular weight (Mw) of Polymer A is lower than the weight average molecular weight (Mw) of Polymer B.

As used herein, the term weight average molecular weight (Mw) is determined by SEC analyses performed on an Alliance Separation Module (Waters 2695), including a pump, autoinjector, degasser, and column oven. The eluent was N-methylpyrolidone (NMP), with 10 mM LiBr. The injection volume was 150 μl. The flow was established at 1.0 ml/min. Three GRAM (PSS) columns (10 μm, 100 Å, ID 8.0 mm×300 mm (300-60 000 Da)+2 times 10 μm, 10000 Å, ID 8.0 mm×300 mm (10 000-50 000 000 Da)) with a guard column (10 μm, Guard, ID 8.0 mm×50 mm) were applied at a temperature of 70° C. The detection was performed with a differential refractive index detector (Waters 2410). The sample solutions were prepared with a concentration of 5 mg solids in 1 ml NMP LiBr 10 mM, and the samples were dissolved for a period of 24 hours. Calibration is performed with eight polystyrene standards (polymer standard services), ranging from 500 to 5,000,000 gram/mol. The calculation was performed with Millenium 32 software (Waters) with a third order calibration curve.

The weight average molecular weight of Polymer A is preferably less than 100 kDalton and higher than 2 kDalton. More preferably, the weight average molecular weight of Polymer A is less than 75 kDalton, more preferably less than 50 kDalton. Most preferably, the weight average molecular weight of Polymer A is from 10 to 35 kDalton.

The weight average molecular weight of Polymer B is preferably higher than 100 kDalton, more preferably higher than 200 kDalton.

The amount of monomer Ai) is preferably from 5 to 15 wt. %, relative to the total weight of monomers charged for the preparation of polymer A.

Polymer A is preferably obtained by polymerisation of a monomer composition A that contains:

Ai) from 5 to 15 wt. % of carboxylic acid functional olefinically unsaturated monomer; and Aii) from 75 to 95 wt. % of at least one olefinically unsaturated monomer different than Ai); and Aiii) at most 10 wt. % of at least one wet adhesion promoting olefinically unsaturated monomer different than Ai) and Aii);

where the amount is given relative to the total weight of monomers charged for the preparation of Polymer A and whereby the summed amount of Ai), Aii) and Aiii) is 100 wt. %.

In case wet adhesion promoting monomer Aiii) is used, the amount is preferably from 0.1 to 10 wt. %, more preferably from 0.1 to 5 wt. %. However, the amount of wet adhesion promoting monomer Aiii) is most preferably 0 wt. %. Thus, Polymer A is more preferably obtained by polymerisation of a monomer composition that contains Ai) from 5 to 15 wt. %, of carboxylic acid functional olefinically unsaturated monomer; and Aii) from 85 to 95 wt. % of at least one olefinically unsaturated monomer different than Ai)

where the amount is given relative to the total weight of monomers charged for the preparation of Polymer A and whereby Ai) and Aii) add up to 100 wt. %.

The hydrophobic vinyl polymer (Polymer B) is obtained by emulsion polymerization of a monomer composition B in the presence of Polymer A where the monomer composition B contains:

Bi) from 87 to 100 wt. % of at least one olefinically unsaturated monomer;

Bii) at most 3 wt. % of carboxylic acid functional olefinically unsaturated monomer, different than Bi); and Biii) at most 10 wt. % of wet adhesion promoting olefinically unsaturated monomer different than Bi);

where the amount is given relative to the total weight of monomers charged for the preparation of Polymer B and where the summed amount of Bi), Bii), Biii) is 100 wt. %.

Preferably the amount of carboxylic acid functional olefinically unsaturated monomer Bii) is 0 wt. %. The amount of wet adhesion promoting olefinically unsaturated monomer Biii) is preferably at most 5 wt. %. In case wet adhesion promoting monomer Biii) is used, the amount is preferably from 0.1 to 5 wt. %. However, the amount of wet adhesion promoting monomer Biii) is most preferably 0 wt. %.

The carboxylic acid functional olefinically unsaturated monomers Ai) and, if present Bii), are preferably selected from the group consisting of acrylic acid, methacrylic acid, and β-carboxyethyl acrylate, citraconic acid, crotonic acid, fumaric acid, itaconic acid, itaconic anhydride, monoalkyl ester of itaconic acid such as for example monomethyl itaconate, maleic acid, maleic anhydride, and combinations thereof; more preferably the carboxylic acid functional olefinically unsaturated monomer is acrylic acid, methacrylic acid, itaconic acid, fumaric acid and mixtures thereof. Most preferred carboxylic acid functional olefinically unsaturated monomer is methacrylic acid.

The monomers Aii) and Bi) are preferably selected from the group consisting of acrylates, methacrylates, arylalkylenes, dienes, vinyl esters, nitriles, olefinically unsaturated halides and any mixture thereof. Examples of suitable dienes are 1,3-butadiene and isoprene. An example of a suitable vinyl ester is vinyl acetate. Suitable arylalkylenes comprise (optionally hydrocarbo substituted) styrene and conveniently the optional hydrocarbo may be $C_{1-10}$hydrocarbyl, more conveniently $C_{1-4}$alkyl. Suitable arylalkylene monomers may be selected from: styrene, α-methyl styrene, vinyl toluene, t-butyl styrene, di-methyl styrene and/or mixtures thereof, especially styrene. Suitable nitriles are acrylonitrile and methacrylonitrile. Suitable olefinically unsaturated halides are vinyl chloride, vinylidene chloride and vinyl fluoride.

The monomers Aii) and Bi) are olefinically unsaturated monomers amenable for copolymerisation, but they do not include carboxylic acid functional olefinically unsaturated monomers. More preferably, the monomers Aii) and Bi) are selected from the group consisting of acrylates, methacrylates, arylalkylenes and any mixture thereof. Preferably the acrylate or methacrylate comprises hydrocarbo (meth)acrylate(s) and conveniently the hydrocarbo moiety may be $C_{1-20}$hydrocarbyl, more conveniently $C_{1-12}$alkyl, most conveniently $C_{1-10}$alkyl, for example $C_{1-8}$alkyl. Suitable (meth)acrylate(s) may be selected from: methyl (meth)acrylate, ethyl (meth)acrylate, isooctyl (meth)acrylate, 4-methyl-2-pentyl (meth) acrylate, 2-methylbutyl (meth) acrylate, isoamyl (meth)acrylate, sec-butyl (meth)acrylate, n-butyl (meth)acrylate, 2-ethylhexyl (meth)acrylate, 2-octyl (meth)acrylate, lauryl (meth)acrylate, isodecyl (meth)acrylate, isobornyl (meth)acrylate, cyclohexyl (meth)acrylate and/or mixtures thereof.

A part of the monomers Aii) and Bi) may contain functional groups for imparting crosslinkablilty when the aqueous binder composition is subsequently dried. The functional groups for providing crosslinkability are preferably selected from epoxy, hydroxyl, ketone and aldehyde groups. Comonomer(s) with functional groups for imparting crosslinkablilty is (are) preferably selected from glycidyl (meth)acrylate, hydroxyalkyl (meth)acrylates such as hydroxyethyl (meth)acrylate, acrolein, methacrolein and methyl vinyl ketone, the acetoacetoxy esters of hydroxyalkyl (meth)acrylates such as acetoacetoxyethyl (meth)acrylate, and keto-containing amides such as diacetone acrylamide. The functional group for providing crosslinkability is most preferably a ketone group.

In case comonomer(s) with functional groups for imparting crosslinkablilty are applied in the process of the present invention, the aqueous binder composition containing the iminiated polymer C is preferably combined with a crosslinking agent (i.e. so that crosslinking takes place e.g. after the formation of a coating therefrom). For example, comonomer(s) with hydroxyl functional groups for imparting crosslinkablilty are used in combination with for example a polyisocyanate as crosslinking agent. Comonomer(s) with functional groups for imparting crosslinkablilty comprising ketone and/or aldehyde functional groups are used in combination with for example a polyamine or a polyhydrazide as crosslinking agent. An example of a suitable polyamine is isophorone diamine. Examples of suitable polyhydrazides are adipic acid dihydrazide, oxalic acid dihydrazide, phthalic acid dihydrazide and terephthalic acid dihydrazide. A preferred polyhydrazide is adipic acid dihydrazide.

A preferred combination of crosslinking agent and functional group for imparting crosslinkablilty when the aqueous binder composition is subsequently dried is the combination of adipic acid dihydrazide as crosslinking agent and at least one ketone group present in the comonomer with functional groups for imparting crosslinkablilty. Diacetone acrylamide (DAAM) is a preferred comonomer with ketone functional groups for use in combination with adipic acid dihydrazide.

Monomers which may further improve the wet adhesion (wet adhesion promoting monomers Aiii) and Biii)) may be used. In case monomer Aii) or Bi) also performs as a wet adhesion promoting monomer, Aiii) resp Biii) is different than Aii) resp Bi). Conveniently further improved wet adhesion may be obtained by copolymerization of at least one monomer selected from the group consisting of:
  i) ketone or acetoacetoxy functional olefinically unsaturated monomer [such as DAAM (diacetone acrylamide), AAEM (acetoacetoxy ethylmethacrylate) and/or mixtures thereof],
  ii) ureido functional olefinically unsaturated monomer, such as those available commercially under the trade names Plex 6852-0, Evonik, combinations and/or mixtures thereof),
  iii) tertiary-amine functional olefinically unsaturated monomer [such as DMAEMA (dimethylamine ethylmethacrylate), and/or DMAEA (dimethylamine ethylacrylate)],
  iv) acetoacetyl and/or ketone functional olefinically unsaturated monomer in combination with polyamine(s) such as polyethylene imine, hydrazide [such as ADH (adipic dihydrazide) and/or semi-carbazide group(s)]; and/or
  v) any suitable combination and/or mixtures thereof.

However in one embodiment of the present invention advantageously the polymer compositions of the invention are substantially free of, and more advantageously have no further wet adhesion promoting groups.

Polymer emulsion A is strongly preferred to be those low molecular weight polymers such as the "oligomers" as described in WO95/29944 and/or WO95/29963. However unlike the 'oligomer"-polymer systems described in WO95/29944 and WO95/29963, the presence of self-crosslinking groups is optional and not a requirement.

In the process according to the invention, at least a part of the carboxylic acid groups present in Polymer A and Polymer B are neutralized during or following the steps A and/or B by the addition of a base to form a (partially) neutralized polymer emulsion (also referred herein as a polyelectrolyte stabilized polymer emulsion). As used herein, polyelectrolyte stabilized emulsion is an emulsion containing polyelectrolytes in such an amount that a stable emulsion is obtained. In the process according to the invention preferably from 40 to 100 mol % of the carboxylic acid groups present in Polymer A and Polymer B are neutralized during or following the steps A and/or B by the addition of a base, such as an organic or inorganic base, examples of which include organic amines such as trialkylamines (e.g. triethylamine, tributylamine), morpholine and alkanolamines such as dimethyl ethanol amine, and inorganic bases such as ammonia, NaOH, KOH, and LiOH. Preferably, the base is selected from the group consisting of ammonia, dimethyl ethanol amine or a mixture thereof. Solids content of the final polymer dispersions obtained by the process of the present invention (from step C) may preferably be from 35 to 55%, more preferably from 37.5 to 50%. Preferably, the neutralization is effected following step A.

The polymer dispersions obtained by the process of the present invention preferably have a pH from 7.5 to 10, more preferably from 8 to 9.

In one embodiment of the present invention, the aqueous binder composition does not comprise another binder than binder C. In another embodiment, the present invention relates to an aqueous binder composition comprising polymer C, obtained as described above, as first binder and further comprising additional binder, wherein the amount of polymer C is at least 10 wt. %, preferably at least 15 wt. %, more preferably at least 20 wt. %, even more preferably at least 25 wt. % and at most 90 wt. %, preferably at most 85 wt. % (amount is given relative to the total amount of binders in the aqueous binder composition).

The present invention further relates to an aqueous coating composition comprising the aqueous binder composition as described above.

The present invention further relates to a method of protective coating a substrate comprising the steps of applying the aqueous coating composition of the present invention to any substrate such as a substrate comprising a lignocellulosic material (such as wood or wood products) and/or aged alkyd resin and/or plastic such as polypropylene and/or metallic substrate, composite materials comprising glass, to form a coating thereon, and drying the coating to form a coated substrate. Preferred substrates are a substrate comprising a lignocellulosic material (such as wood or wood products) and/or aged alkyd resin.

Unless otherwise indicated herein the preferences for the acrylic polymers of the invention such as for example Tg, monomer compositions, concentrations, and typical additives are well known and include those described in WO95/29944 or WO95/29963. Therefore the reader is referred to the contents of these documents (especially for example the sections in WO95/29944 from page 6 line 8 to page 15 line 13; and in WO95/29963 from page 5 line 44 to page 14 line 17) for acrylic polymers that would be suitable for imination in the process of the present invention.

The aqueous binder composition according to the invention preferably has a total VOC level of less than 5000 ppm, more preferred less than 1000 ppm, and most preferred of less than 250 ppm.

Typically, the aqueous binder composition needs to be film forming at room temperature. For this purpose organic cosolvent may be needed. Preferably, the aqueous binder composition according to the invention requires less than 15 wt. % of organic cosolvent based on total composition for this purpose, more preferred less than 10 wt. %, and most preferred less than 5 wt. %.

Paints based on aqueous binder compositions according to the invention will have a VOC concentration of less than 240 g/L, more preferred less than 130 g/L, and most preferred less than 80 g/L.

The present invention is now illustrated by the following examples.

Explaining Abbreviations

MMA methyl methacrylate
BMA n-butyl methacrylate
BA n-butyl acrylate
DAAM diacetone acrylamide
MAA methacrylic acid
EA ethyl acrylate
DMAEMA dimethylaminoethyl methacrylate
LMKT lauryl mercaptan=chain transfer agent
ADH adipic dihydrazide=crosslinker
PI propylene imine
Demin. water demineralized water
Fosfodet FAZ109V surfactant (containing 20% active surfactant)
AMIETOL M21 dimethylethanolamine (neutralizing agent)
MFFT minimum film forming temperature Colloidal Stability The stability of the binders is determined by storing the material at room temperature for 4 weeks and 52° C. while monitoring the formation of sediment (visual observation) in 4 weeks exposure at 52° C.

Stability is then judged as follows:
Stable No sediment formed after 4 weeks
Unstable Sediment formed or emulsion gelled Adhesion Test Wet adhesion of coatings comprising the binders from the examples was determined according to the following procedure:

Polymer emulsions are formulated by addition of ethyldiglycol (EDG) so that the MFFT is below 5° C. at 75% relative humidity and when cast on glass the resulting coating films are without film defects at room temperature. The pH of this mixture is then set at 9.2±0.2 by addition of an aqueous solution of ammonia (25%), followed by the addition of a 10% aqueous solution of a thickener (Thixol 53 L), until the viscosity of the formulation is around 1000 mPa·s. To this mixture 1.2 wt. % of a defoamer (Tego Airex 902W), and 0.35 wt. % of thickener (Borchigel L75N (50% in water)) are added. The overall solids content is adjusted to 32% by the addition of $H_2O$. Next, the mixture is stirred at 2000 rpm for 15 minutes.

The formulation as described above is applied by a bird applicator at a wet layer thickness of 250 μm to a test panel coated with aged alkyd. [The test panels were prepared by applying a solvent based alkyd (Sigma schakelverf SGL) on a metal substrate which was dried for one week at 80° C. 50% of the surface was sanded prior to applying the formulation on the sanded and non-sanded part.] The wet films are dried at environmental conditions (ambient temperature and 50% relative humidity) for one hour followed by 16 hours at 50° C. On the dried films cross-cuts through the film are made with a field size of 1 $cm^2$ per square, both on the sanded and non-sanded parts of the panel. The test panels are tested on an Erichsen scrub resistance tester [Model 494, by scrubbing 2000 times with a DIN-53-718/B2 brush. 15 ml of an aqueous solution of a lubricant, Marlon A 350 (1 part Marlon A 350 on 200 parts H₂O), is applied to the film prior to testing and after each 500 scrubs for a total of 2000 scrubs.]

If after 2000 scrubs the coating is still completely undamaged, the test panel is dried by means of a towel and judged on adhesion by applying a piece of tape (Sellotape clear 1109, 25 mm width) which is then firmly pulled off. The adhesion is then judged as follows:

| | | |
|---|---|---|
| 5: | excellent adhesion | (less than 5% of the film removed) |
| 4: | | (at least 5% of the film removed) |
| 3: | | (at least 15% of the film removed) |
| 2: | | (at least 35% of the film removed) |
| 1: | | (at least 65% of the film removed) |
| 0: | poor adhesion | (at least 75% of the film removed) |

EXPERIMENTS AND EXAMPLES

Preparation of Polymer A-Polymer B Emulsion 1

To a round bottom flask equipped with stirrer, condenser, nitrogen adapter and a thermocouple are added 858.3 parts of demineralized water, 0.94 parts of sodium bicarbonate, and 2.91 parts of Fosfodet FAZ109V. The reactor contents are heated to 70° C.

As soon as the temperature of 70° C. is reached, 5% of a first monomer feed, consisting of 204.4 parts of demineralized water, 0.46 parts of sodium bicarbonate, 8.75 parts of Fosfodet FAZ109V, 361.2 parts of methyl methacrylate, 28.0 parts of methacrylic acid, 77.1 parts of ethyl acrylate, and 7.0 parts of lauryl mercaptan, is added, and the reactor contents are further heated to 80° C. At 80° C. a solution of 0.4 parts of sodium persulphate in 27.6 parts of demineralized water is added. The mixture is stirred for 5 minutes, after which the temperature is further increased to 85° C. At 85° C. feeding the remainder of the monomer feed and an initiator feed, consisting of 1.0 part of sodium persulphate and 64.3 parts of demineralized water, are started. The monomer feed should take 60 minutes, while the initiator feed should take 70 minutes. After completion of both feeds, the temperature is maintained at 85° C. for 30 minutes. The batch is cooled to 80° C. and 48.5 parts of a 25% ammonia solution pre-mixed with 48.5 parts of demineralized water are added in 10 minutes. The batch is further cooled to 30° C. and the solids contents of the first polymerization stage are adjusted to 27.5% with demineralized water.

509.0 parts of the reactor phase are transferred to a new round bottom flask equipped with stirrer, condenser, nitrogen adapter and a thermocouple, together with 27.4 parts of demineralized water and 0.8 parts of sodium persulphate (free radical initiator). 10% of a second monomer feed, consisting of 41.1 parts of demineralized water, 763.6 parts of the product of the first polymerization stage, 315.7 parts of n-butyl methacrylate, 4.0 parts of n-butyl acrylate, 9.9 parts of diacetone acrylamide, and 0.4 parts of Amietol M21, is added, after which the reactor contents are heated to 85° C. Before addition of the second monomer feed addition the mixture should be homogeneously emulsified.

As soon as the reaction temperature of 85° C. is reached, a start is made with the addition of the remainder of the remainder second monomer feed. This should take 90 minutes. Simultaneously, a second initiator feed, consisting of 48.2 parts of demineralized water and 1.2 parts of sodium persulphate, is started, and which should take 100 minutes. After completion of the monomer feed, the feed vessel is rinsed with 55.1 parts of demineralized water and the reaction temperature of 85° C. is maintained for 30 minutes.

The reactor contents are cooled to 45° C., after which 4.6 parts of adipic dihydrazide are added. Following stirring at 45° C. for 30 minutes, the reactor contents are cooled to 25° C. The solids content of the emulsion is adjusted to 37.5% using demineralized water.

Preparation of Polymer A-Polymer B Emulsion 2-16

Following the general recipe described above, the following ingredients are used (if not mentioned in the Table below the amounts are the same as in Emulsion 1).

TABLE 1a

| Polymer A-Polymer B emulsion | | | | | | | | |
|---|---|---|---|---|---|---|---|---|
| Emulsion | 2 | 3 | 4 | 5 | 6 | 7 | 8 | 9 |
| First monomer feed | | | | | | | | |
| DAAM | | | | | | | | 23.3 |
| MMA | 361.2 | 413.0 | 413.0 | 320.0 | 320.0 | 371.9 | 371.9 | 343.5 |
| MAA | 28.0 | 28.0 | 28.0 | 56.0 | 56.0 | 56.0 | 56.0 | 28.0 |
| EA | 77.1 | 25.3 | 25.3 | 90.4 | 90.4 | 38.5 | 38.5 | 71.6 |
| LMKT | 16.3 | 16.3 | 7.0 | 16.3 | 7.0 | 16.3 | 7.0 | 16.3 |
| Ammonia addn. | | | | | | | | |
| 25% ammonia soln. | 48.5 | 48.5 | 48.5 | 97.0 | 97.0 | 97.0 | 97.0 | 48.5 |
| Reactor contents | | | | | | | | |
| Demin. Water | 262.6 | 164.4 | 249.2 | 10.2 | 207.5 | 19.4 | 207.3 | 38.4 |
| 1ˢᵗ polym stage | 194.6 | 234.8 | 196.8 | 519.1 | 238.6 | 517.0 | 250.0 | 481.4 |
| Second monomer feed | | | | | | | | |
| Demin. Water | 393.9 | 383.7 | 373.8 | 15.3 | 311.2 | 29.1 | 311.0 | 89.7 |
| 1ˢᵗ polym stage | 291.9 | 352.2 | 295.2 | 778.6 | 357.9 | 775.6 | 374.9 | 722.0 |
| BMA | 258.9 | 257.1 | 481.8 | 301.1 | 235.3 | 161.8 | 505.1 | 146.0 |
| BA | 252.7 | 250.9 | 19.2 | 12.0 | 265.8 | 157.9 | 6.4 | 164.9 |
| DAAM | 15.8 | 15.7 | 15.8 | 9.9 | 15.8 | 9.9 | 15.8 | 9.8 |
| MAA | | | 10.6 | 6.6 | 10.6 | | | 6.5 |
| ADH | 7.3 | 14.3 | 7.3 | 4.6 | 14.4 | 14.4 | 14.4 | 14.3 |

TABLE 1b

| Emulsion | 10 | 11 | 12 | 13 | 14 | 15 | 16 |
|---|---|---|---|---|---|---|---|
| First monomer feed | | | | | | | |
| DAAM | 23.3 | 23.3 | 23.3 | 23.3 | 23.3 | 23.3 | 23.3 |
| MMA | 343.5 | 395.0 | 395.0 | 302.1 | 302.1 | 353.9 | 253.9 |
| MAA | 28.0 | 28.0 | 28.0 | 56.0 | 56.0 | 56.0 | 56.0 |
| EA | 71.6 | 20.0 | 20.0 | 85.0 | 85.0 | 33.2 | 33.2 |
| LMKT | 7.0 | 16.3 | 7.0 | 16.3 | 7.0 | 16.3 | 7.0 |
| Ammonia addn. | | | | | | | |
| 12.5% ammonia soln. | 48.5 | 48.5 | 48.5 | 97.0 | 97.0 | 97.0 | 97.0 |
| Reactor contents | | | | | | | |
| Demin. Water | 194.0 | 37.1 | 164.4 | 185.9 | | 184.4 | |
| 1ˢᵗ polym stage | 195.3 | 483.1 | 234.8 | 206.2 | 566.6 | 208.3 | 569.9 |
| Second monomer feed | | | | | | | |
| Demin. Water | 452.8 | 86.5 | 383.7 | 433.8 | | 430.2 | |
| 1ˢᵗ polym stage | 293.1 | 724.7 | 352.2 | 309.3 | 850.0 | 312.4 | 854.8 |
| BMA | 478.3 | 313.5 | 257.1 | 501.6 | 157.2 | 232.5 | 286.4 |
| BA | 19.1 | 4.0 | 250.9 | 6.3 | 153.4 | 264.5 | 11.4 |
| DAAM | 15.7 | 9.8 | 15.7 | 15.7 | 9.6 | 15.8 | 9.4 |
| MAA | 10.5 | | | | | 10.5 | 6.3 |
| ADH | 14.3 | 14.3 | 14.3 | 14.3 | 14.0 | 14.4 | 13.7 |

Example 1: Imination of Polymer A-Polymer B Emulsion 1

To a round bottom flask equipped with stirrer, condenser, nitrogen adapter and a thermocouple are added 1500 parts of the Polymer A-Polymer B emulsion 1. The required (such to obtain the desired PI/acid ratio) amount of propylene imine added is calculated by taking the total mass of methacrylic acid used for the 1500 parts, dividing this by the molecular weight of methacrylic acid, and multiplying this by the molecular weight of propylene imine times the propylene imine to acid ratio (in this example 0.2). Hence, in this case (16.8/86)*(59*0.2)=2.3 parts. In each example, propylene imine was diluted to 50% with demineralized water prior to addition.

The reactor contents are heated to 70° C., after which the propylene imine-water mixture is added over a period of 90 minutes. At the end of the addition, the temperature of 70° C. is maintained until the residual propylene imine level is less than 1 ppm. The batch is cooled to room temperature and filtered.

Examples 2-16

Following the general recipe from Example 1, the following ingredients are used. See Table 2.

TABLE 2a

| Example | 2 | 3 | 4 | 5 | 6 | 7 | 8 | 9 |
|---|---|---|---|---|---|---|---|---|
| O/P emulsion | 2 | 3 | 4 | 5 | 6 | 7 | 8 | 9 |
| PI/acid ratio | 0.2 | 0.8 | 0.2 | 0.2 | 0.8 | 0.8 | 0.8 | 0.2 |

TABLE 2b

| Example | 10 | 11 | 12 | 13 | 14 | 15 | 16 |
|---|---|---|---|---|---|---|---|
| O/P emulsion | 10 | 11 | 12 | 13 | 14 | 15 | 16 |
| PI/acid ratio | 0.8 | 0.8 | 0.8 | 0.2 | 0.8 | 0.8 | 0.2 |

Table 3 below gives an overview of the measured specifications of the Polymer A-Polymer B emulsions 1-16 prepared as described above; Polymer B has a higher weight average $M_w$ than Polymer A.

Comparative Experiment 1=Polymer A-Polymer B Emulsion 1
Comparative Experiment 2
Preparation of Polymer A-Polymer B Emulsion with Low Acid Value To a round bottom flask equipped with stirrer, condenser, nitrogen adapter and a thermocouple are added 858.3 parts of demineralized water, 0.94 parts of sodium bicarbonate, and 2.91 parts of Fosfodet FAZ109V. The reactor contents are heated to 70° C.

As soon as the temperature of 70° C. is reached, 5% of a first monomer feed, consisting of 204.4 parts of demineralized water, 0.46 parts of sodium bicarbonate, 8.75 parts of Fosfodet FAZ109V, 401.0 parts of methyl methacrylate, 18.7 parts of methacrylic acid, 46.6 parts of butyl methacrylate, and 7.0 parts of lauryl mercaptan, is added, and the reactor contents are further heated to 80° C. At 80° C. a solution of 0.4 parts of sodium persulphate in 27.6 parts of demineralized water is added. The mixture is stirred for 5 minutes, after which the temperature is further increased to 85° C. At 85° C. feeding the remainder of the monomer feed and an initiator feed, consisting of 1.0 part of sodium persulphate and 64.3 parts of demineralized water, are started. The monomer feed should take 60 minutes, while the initiator feed should take 70 minutes. After completion of both feeds, the temperature is maintained at 85° C. for 30 minutes. The batch is cooled to 80° C. and 48.5 parts of a 25% ammonia solution pre-mixed with 48.5 parts of demineralized water are added in 10 minutes. The batch is further cooled to 30° C. and the solids contents of the first polymerization stage are adjusted to 27.5% with demineralized water. The amount of methacrylic acid (monomer Ai)) is 4 wt. % (relative to the total weight of monomers charged for the preparation of polymer A). The obtained Polymer A has an acid value of 26 mg KOH/g of solid Polymer A.

509.0 parts of the reactor phase are transferred to a new round bottom flask equipped with stirrer, condenser, nitrogen adapter and a thermocouple, together with 27.4 parts of demineralized water and 0.8 parts of sodium persulphate (free radical initiator). 10% of a second monomer feed, consisting of 41.1 parts of demineralized water, 763.6 parts

TABLE 3

| Polymer A-polymer B emulsion | Polymer A ("oligomer") specifications | | | | Polymer B specifications | | PolA/PolB ratio (s/s-wt. %) | Surfactant conc. (wt. %) | % of carboxylic acid (and carboxylate salt groups) reacted with propylene imine |
|---|---|---|---|---|---|---|---|---|---|
| | Weight average MW (kD) | Tg (° C.) | Acid monomer conc. (wt. %) | X-linking monomer conc. (wt %) | Tg (° C.) | Acid monomer conc. (wt %) | | | |
| 1 | 24 | 80 | 6 | 0 | 20 | 0 | 51.2/48.8 | 0.10 | 20 |
| 2 | 12 | 80 | 6 | 0 | −20 | 0 | 20.2/79.8 | 0.04 | 20 |
| 3 | 12 | 100 | 6 | 0 | −20 | 0 | 23.5/76.5 | 0.05 | 80 |
| 4 | 23 | 100 | 6 | 0 | 20 | 2 | 20.4/79.6 | 0.04 | 20 |
| 5 | 12 | 80 | 12 | 0 | 20 | 2 | 51.8/48.2 | 0.10 | 20 |
| 6 | 22 | 80 | 12 | 0 | −20 | 2 | 23.6/76.4 | 0.05 | 80 |
| 7 | 11 | 100 | 12 | 0 | −20 | 0 | 51.7/48.3 | 0.10 | 80 |
| 8 | 20 | 100 | 12 | 0 | 20 | 0 | 24.5/75.5 | 0.05 | 80 |
| 9 | 12 | 80 | 6 | 5 | −20 | 2 | 50.1/49.9 | 0.09 | 20 |
| 10 | 23 | 80 | 6 | 5 | 20 | 2 | 20.4/79.6 | 0.04 | 80 |
| 11 | 13 | 100 | 6 | 5 | 20 | 0 | 50.2/49.8 | 0.09 | 80 |
| 12 | 22 | 100 | 6 | 5 | −20 | 0 | 23.5/76.5 | 0.05 | 20 |
| 13 | 12 | 80 | 12 | 5 | 20 | 0 | 21.2/78.8 | 0.04 | 20 |
| 14 | 22 | 80 | 12 | 5 | −20 | 0 | 54.7/45.3 | 0.11 | 80 |
| 15 | 11 | 100 | 12 | 5 | −20 | 2 | 21.4/78.6 | 0.04 | 80 |
| 16 | 20 | 100 | 12 | 5 | 20 | 2 | 55.4/44.6 | 0.11 | 20 | of the product of the first polymerization stage, 315.7 parts of n-butyl methacrylate, 4.0 parts of n-butyl acrylate, 9.9 parts of diacetone acrylamide, and 0.4 parts of Amietol M21, is added, after which the reactor contents are heated to 85° C. Before addition of the second monomer feed addition the mixture should be homogeneously emulsified.

As soon as the reaction temperature of 85° C. is reached, a start is made with the addition of the remainder second monomer feed. This should take 90 minutes. Simultaneously, a second initiator feed, consisting of 48.2 parts of demineralized water and 1.2 parts of sodium persulphate, is started, and which should take 100 minutes.

After completion of the monomer feed, the feed vessel is rinsed with 55.1 parts of demineralized water and the reaction temperature of 85° C. is maintained for 30 minutes.

The reactor contents are cooled to 45° C., after which 4.6 parts of adipic dihydrazide are added. Following stirring at 45° C. for 30 minutes, the reactor contents are cooled to 25° C. The obtained Polymer B has an acid value of 0 mg KOH/g of solid Polymer B.

The amount of Fosfodet FAZ109V surfactant applied is 0.25 wt. % based on the total weight of monomers charged for the preparation of polymer A and polymer B.

During the polymerization of the second monomer feed an increasing amount of sediment is observed, both on the reactor wall and stirrer. The resulting polymer emulsion shows a lot of sediment upon filtration, the reactor wall and stirrer are extremely polluted with polymer sediment.

This comparative experiment shows that a stable polymer emulsion cannot be obtained when the acid value of the Polymer A-Polymer B emulsion is too low and a limited amount of added surfactant is applied.

Comparative Experiments 3-5

These comparative experiments serve to show that introducing amine groups in the Polymer A via the way as described in this invention cannot be achieved by copolymerizing tertiary amine functional monomers and acid functional monomers. For this purpose dimethylaminoethyl methacrylate (DMAEMA) was copolymerized together with methacrylic acid (MAA) in Example 1. All these attempts failed resulting in massive coagulation already after between 5 and 15 minutes after starting the monomer feed of Polymer A, see Table 5.

Comparative Experiment 3

To a round bottom flask equipped with stirrer, condenser, nitrogen adapter and a thermocouple are added 858.3 parts of demineralized water, 0.94 parts of sodium bicarbonate, and 2.91 of Fosfodet FAZ109V. The reactor contents are heated to 70° C.

As soon as the temperature of 70° C. is reached, 5% of a first monomer feed, consisting of 204.4 parts of demineralized water, 0.46 parts of sodium bicarbonate, 8.75 parts of Fosfodet FAZ109V, 327.6 parts of methyl methacrylate, 28.0 parts of methacrylic acid, 37.3 parts of diacetone acrylamide, 56.4 parts of ethyl acrylate, 17.0 parts of dimethylaminoethyl methacrylate, and 21.0 parts of lauryl mercaptan, is added, and the reactor contents are further heated to 80° C. At 80° C. a solution of 0.4 parts of sodium persulphate in 27.6 parts of demineralized water is added. The mixture is stirred for 5 minutes, after which the temperature is further increased to 85° C. At 85° C. a start is made with feeding the remainder of the monomer feed and an initiator feed, consisting of 1.0 part of sodium persulphate and 64.3 parts of demineralized water, are started. The monomer feed should take 60 minutes, while the initiator feed should take 70 minutes. Already after 5 minutes the reactor contents are completely gelled, showing that the combination of amine groups and carboxylic acid groups incorporated in a single polymer is not feasible.

Comparative Experiment 4-5

Following the general recipe described in comparative experiment 1, the following ingredients are used (if not mentioned in the Table below the amounts are the same as in Comparative experiment 1).

TABLE 4

| Comparative Experiment # | 4 | 5 |
|---|---|---|
| First monomer feed | | |
| DAAM | 37.3 | 37.3 |
| MMA | 319.9 | 312.2 |
| MAA | 18.7 | 9.3 |
| DMAEMA | 34.0 | 51.1 |
| EA | 56.4 | 56.4 |
| LMKT | 21.0 | 21.0 |

In Comparative example 4 the reactor contents gelled 10 minutes after starting the monomer feed, while in Comparative example 5 the reactor contents gelled after 15 minutes after starting the monomer feed.

The wet adhesion test results and the colloidal stability assessment of comparative experiment 1 and examples 1-16 are shown in Table 5

TABLE 5

| Example | Wet adhesion | Colloidal stability |
|---|---|---|
| Comp Ex 1 (non-iminated PolA-PolB emulsion 1) | 2 | stable |
| Ex 1 | 5 | stable |
| Ex 2 | 5 | stable |
| Ex 3 | 5 | stable |
| Ex 4 | 5 | stable |
| Ex 5 | 5 | stable |
| Ex 6 | 5 | stable |
| Ex 7 | 5 | stable |
| Ex 8 | 5 | stable |
| Ex 9 | 5 | stable |
| Ex 10 | 5 | stable |
| Ex 11 | 5 | stable |
| Ex 12 | 5 | stable |
| Ex 13 | 5 | stable |
| Ex 14 | 5 | stable |
| Ex 15 | 5 | stable |
| Ex 16 | 5 | stable |
| Comp Ex 2 | nd | unstable |
| Comp Ex 3 | nd | nd |
| Comp Ex 4 | nd | nd |
| Comp Ex 5 | nd | nd |

The invention claimed is:

1. A process for preparing an aqueous binder composition free of organic solvent, the process comprising at least the following steps:
   A) preparing a hydrophilic vinyl polymer (Polymer A) having an acid value (AV) from 32 to 98 mg KOH/g of solid Polymer A by polymerizing a monomer composition A that comprises:
      Ai) at least one carboxylic acid functional olefinically unsaturated monomer;
      Aii) at least one olefinically unsaturated monomer different than monomer Ai); and
      Aiii) optionally at least one wet adhesion promoting olefinically unsaturated monomer different than monomers Ai) and Aii); and
   B) preparing a hydrophobic vinyl polymer (Polymer B) having an acid value (AV) of no more than 23.4 mg KOH/g of solid Polymer B by emulsion polymerization of a monomer composition B in the presence of the Polymer A, wherein the monomer composition B comprises:
- Bi) at least one olefinically unsaturated monomer;
- Bii) optionally a carboxylic acid functional olefinically unsaturated monomer different than monomer Bi); and
- Biii) optionally a wet adhesion promoting olefinically unsaturated monomer different than monomer Bi);

wherein at least a part of the carboxylic acid groups that are present in Polymer A and Polymer B are neutralized during or following the step A and/or during the step B to form at least a partially neutralized polymer emulsion; wherein the Polymer A has a weight average molecular weight (Mw) that is lower than a weight average molecular weight (Mw) of the Polymer B; and the process further comprises the step of:

C) reacting at least 10 mol % of the carboxylic acid and/or carboxylate salt groups of the at least partially neutralized polymer emulsion with an iminating agent to produce an iminated Polymer C; wherein surfactant in steps A), B) and C) is present in a total amount of at most 0.5 wt. %, based on total weight of monomers present for preparing the Polymers A and B.

2. The process according to claim 1, wherein the surfactant in steps A), B) and C) is present in a total amount of at most 0.2 wt. %, based on the total weight of monomers present for the preparing the Polymers A and B.

3. The process according to claim 1, further comprising adding the total amount of surfactant at the start of step A) and/or during step A).

4. The process according to claim 1, which comprises reacting from 10 mol % to 90 mol % of the total amount of carboxylic acid and carboxylate salt groups present in the at least partially neutralized polymer emulsion with an iminating agent to produce the iminated Polymer C.

5. The process according to claim 1, wherein the iminating agent is propyleneimine.

6. The process according to claim 1, wherein the carboxylic acid and carboxylate salt groups that are reacted with the iminating agent is determined such that the degree of iminization is between DI low and DI high determined by the following formulas:

$$DI^{LOW}(\%) = [(AV*0.682) - 11.8]*100\%,$$

$$DI^{HIGH}(\%) = [(AV*1.061) - 14]*100\%,$$

where AV is the AV of the at least partially neutralized polymer emulsion.

7. The process according to claim 1, wherein the monomer Ai) is present in an amount from 5 to 15 wt. %, relative to the total weight of monomers present for preparing the polymer A.

8. The process according to claim 1, wherein polymer A is a reaction product of the monomer composition A which comprises:
- Ai) from 5 to 15 wt. %, of the at least one carboxylic acid functional olefinically unsaturated monomer; and
- Aii) from 85 to 95 wt. % of the at least one olefinically unsaturated monomer different than monomer Ai), wherein amounts of monomers Ai) and Aii) are relative to total weight of monomers present for preparing the Polymer A, and wherein the amounts of monomers Ai) and Aii) add up to 100 wt. %.

9. The process according to claim 1, wherein the Polymer B has an acid value of no more than 6.5 mg KOH/g of solid Polymer B.

10. The process according to claim 1, which comprises neutralizing from 40 to 100 mol % of the total amount of carboxylic acid groups present in the Polymers A and B during or following the steps A) and/or B).

11. The process according to claim 1, wherein
a) the Polymer A has a $T_g$ from 40° C. to 125° C.; and
b) the Polymer B has a $T_g$ which is at least 25° C. below the $T_g$ of the Polymer A.

12. The process according claim 1, wherein
a) the Polymer A has a $T_g$ <50° C.; and
b) the Polymer B has a $T_g$ which is at least 25° C. higher than the $T_g$ of the Polymer A.

13. The process according to claim 1, wherein step A) comprises preparing the Polymer A by emulsion polymerization.

14. The process according to claim 1, wherein the carboxylic acid functional olefinically unsaturated monomers Ai) and Bii) are selected from the group consisting of acrylic acid, methacrylic acid, and β-carboxyethyl acrylate and combinations thereof.

15. The process according claim 1, wherein the monomers Aii) and Bi) are selected from the group consisting of acrylates, methacrylates, arylalkylenes and mixtures thereof.

16. The process according to claim 1, wherein at least a part of the monomers Aii) and Bi) contain functional groups for imparting crosslinkability when the aqueous binder composition is subsequently dried.

17. The process according to claim 1, wherein the weight average molecular weight of Polymer A has a weight average molecular weight which is less than 100 kDalton and higher than 2 kDalton.

18. An aqueous binder composition obtained by the process according to claim 1.

19. The aqueous binder composition according to claim 18, wherein the binder composition comprises the Polymer C in an amount which is at least 10 wt. % and at most 90 wt. %, relative to the total amount of binders in the aqueous binder composition.

20. An aqueous coating composition comprising an aqueous binder which is prepared by the process according to claim 1.

21. A method of protective coating of a substrate comprising the steps of:
(1) applying the aqueous coating composition according to claim 20 to a substrate formed of at least one material selected from the group consisting of lignocellulosic material, aged alkyd resin, plastic, metal and glass-containing composite materials to form a coating thereon, and
(2) drying the coating to form a coated substrate.

* * * * *